June 18, 1929.  M. WATERS  1,717,639

COMBINED AIR CLEANER AND OIL SEPARATOR

Filed March 21, 1928

Inventor
Maurice Waters
By Blackmore, Spencer & Hurh
Attorneys

Patented June 18, 1929.

1,717,639

UNITED STATES PATENT OFFICE.

MAURICE WATERS, OF DETROIT, MICHIGAN, ASSIGNOR TO GENERAL MOTORS CORPORATION, OF DETROIT, MICHIGAN, A CORPORATION OF DELAWARE.

COMBINED AIR CLEANER AND OIL SEPARATOR.

Application filed March 21, 1928. Serial No. 263,485.

This invention relates to a combined air cleaner and oil separator for use on internal combustion engines. The oil separator removes oil particles from the crankcase vapors drawn into the engine by way of the air cleaner. The air cleaner cleans the air drawn into the engine from the atmosphere and effects a further cleaning of the crankcase vapors, projecting particles of oil carried thereby against the walls of the cleaner to which they adhere. The air cleaner may be provided with the usual dust discharge slot or the adhesion of dust to the oil coated walls of the cleaner may alone be relied upon to segregate the dust.

The invention is embodied in a type of air cleaner having an inlet arranged to whirl the entering air and having an axial clean air outlet. The cleaner is likewise preferably provided with a tangentional dust outlet. The oil separator takes the form of a cylindrical jacket surrounding the air cleaner and connected to the crankcase and to the air cleaner and equipped with means to whirl the crankcase vapors in their passage to the cleaner to effect separation of oil. Provision is made for returning the separated oil to the crankcase.

Figure 1:
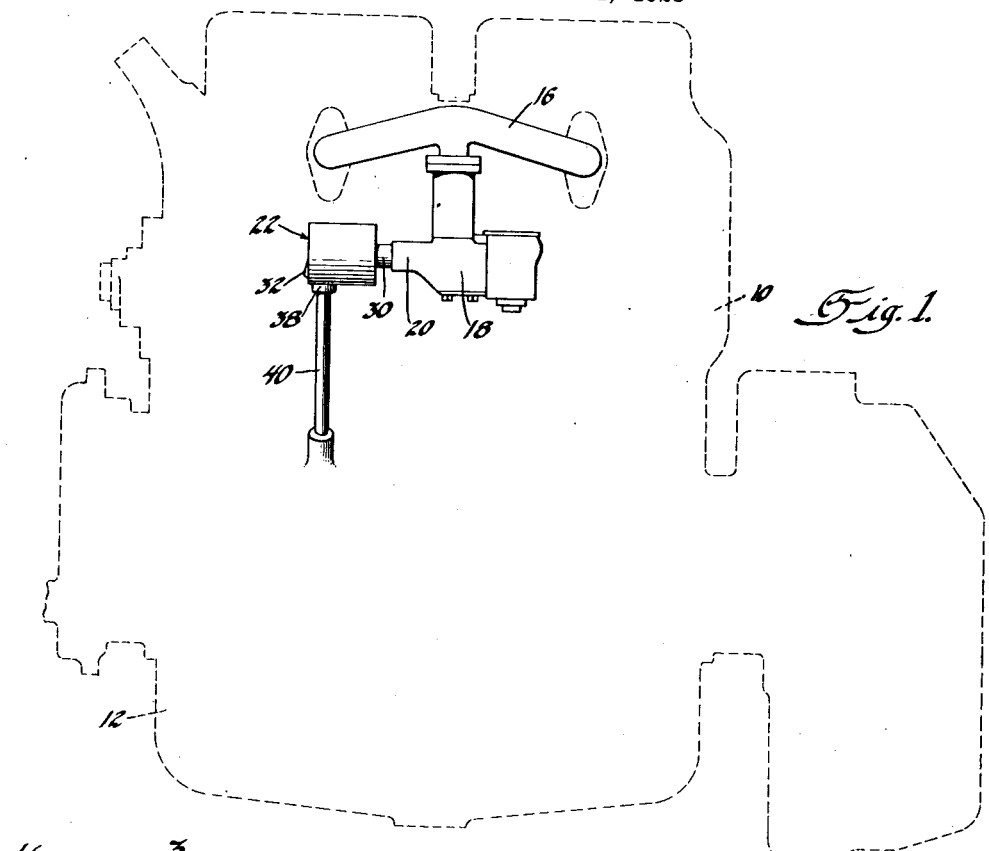
Figure 1 is a diagrammatic view showing the application of my invention to an internal combustion engine of well-known type.
Figure 2:
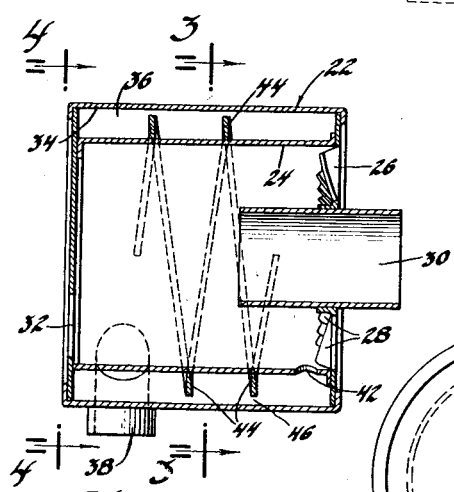
Figure 2 is a longitudinal section through the combined air cleaner and oil separator.
Figure 3:
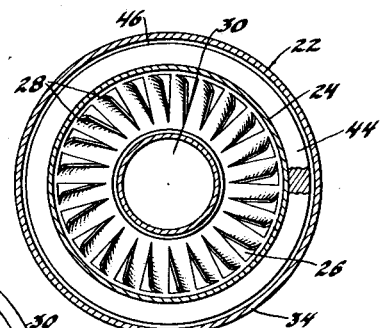
Figure 3 is a view taken on line 3—3 of Figure 2.
Figure 4:
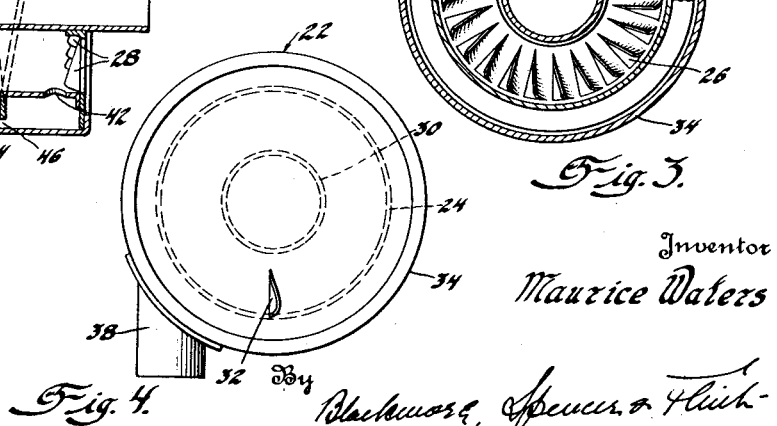
Figure 4 is an end view of the combined cleaner and separator taken on line 4—4 of Figure 2.

10 indicates an internal combustion engine of conventional type having a crankcase 12 serving as a lubricant reservoir and equipped with a breather opening 14. 16 indicates the intake manifold supplied with fuel by carburetor 18 having air intake 20. 22 indicates my combined air cleaner and separator. The air cleaner comprises a cylindrical casing 24 provided with an annular inlet 26 equipped with a series of helical blades 28 for imparting whirling motion to the entering air. 30 indicates the axial clean air outlet which withdraws clean air from the center of the vortex created by the helical blades. Obviously the outlet 30 may extend into the cleaner from either end of the casing as preferred. The casing is provided with a dust discharge slot 32 adjacent its periphery and tangentially arranged as shown.

Surrounding the casing 24 is a cylindrical shell 34 providing an annular jacket 36 about the cleaner casing. The shell 34 is provided at one end with a port 38 preferably tangentially arranged and communicating with the crankcase breather 14 through pipe 40. At the other end of the jacket the casing 24 is provided with a port 42 for admitting crankcase vapors into the air cleaner. Within the jacket 36 is preferably located a spiral partition 44 which, in conjunction with the tangential inlet, causes the crankcase vapors to whirl about the shell 24 and effects separation of oil particles by centrifugal action. It will be noted that the spiral partition 44 is spaced in the outer shell of the cleaner as at 46 so that the oil collecting in the bottom of the cleaner may run back to the crankcase through the port 38 and pipe 40.

The device operates as follows: Impelled by engine suction air is drawn into the cleaner past the blades 26 which give the air a helical motion and cause the dust particles to be thrown outwardly so that they follow the inner surface of the casing. Upon reaching the slot 32 the dust is projected out of the casing and the cleaned air finds its way to the carburetor air intake 20, through the axial outlet 30. The suction of the engine is also effective to draw crankcase vapors through the pipe 40 and port 38 into the jacket 36 where it is given a whirling motion by virtue of the tangentional arrangement of the port 38 and the spiral partition 44 and is discharged through the port 42 joining the whirling column of air passing through the air cleaner. The spiral path of the crankcase vapors through the jacket 36 causes oil particles to be separated out by centrifugal action and these in time trickle down to the bottom of the shell 34 and return to the crankcase through the port 38. The crankcase vapors entering the air cleaner through port 42 contain a small proportion of oily vapors which are, to a large extent, thrown outwardly by the whirling action and collect on the interior of the casing 24. This oily coating catches dust thrown outwardly by the whirling action and assists in its segregation. The vapors are then drawn into the engine along with the clean air.

This apparatus is capable of considerable modification. It is not always necessary to provide both the tangential inlet 38 and the spiral partition 44 for one or the other may suffice to give the desired whirling motion. In some installations it may be desirable to eliminate the dust discharge slot 32 and rely upon the oil coated walls of the cleaner casing to catch the dust. In such event it will be necessary for the operator to occasionally remove the cleaner and immerse it in gasolene to remove the oil and collected grit. Various other modifications will occur to those skilled in the art.

I claim:

1. A combined air cleaner and oil separator comprising a cylindrical casing provided at one end with an air admission opening arranged to impart a whirling motion to the entering air, said casing being provided with an axial clean air outlet, a cylindrical shell surrounding the casing and providing a jacket thereabout, said jacket being provided with a port adapted for connection with an engine crankcase, said port being arranged to give the entering vapors a spiral motion to separate oil particles therefrom and a port in the casing establishing communication between the jacket and the interior of the casing for inducing flow of vapors through the jacket.

2. A combined air cleaner and oil separator comprising a cylindrical casing provided at one end with an annular series of helical blades for imparting whirling motion to the entering air, said casing also having an axial clean air outlet and a peripheral dust discharge outlet at the end of the casing opposite the helical blades, a cylindrical shell surrounding the casing and providing a jacket thereabout, said jacket being provided with a port adapted for connection with an engine crankcase, said port being arranged to give the entering vapors a spiral motion about the axis of the casing to separate oil particles therefrom, and a port in the casing establishing communication between the jacket and the interior of the casing for inducing flow of vapors through the jacket.

3. A combined air cleaner and oil separator comprising a cylindrical casing provided at one end with an annular series of helical blades for imparting whirling motion to the entering air, said casing also having an axial clean air outlet and a peripheral dust discharge outlet at the end of the casing opposite the helical blades, a cylindrical shell surrounding said casing and providing a jacket thereabout, said jacket being provided with a port adapted for connection with an engine crankcase, a spiral partition within said jacket for giving the vapors a spiral motion to relieve them of their oil content, and a port in the casing adjacent the helical blades establishing communication between the jacket and the interior of the casing for inducing a flow of vapors through the jacket.

4. In the combination as defined in claim 3, said partition being spaced from the outer shell at the bottom of the casing so as to provide a passage for the return of separated oil particles to the crankcase through the port in said jacket.

In testimony whereof I affix my signature.

MAURICE WATERS.